US011679571B2

(12) United States Patent
Bestgen et al.

(10) Patent No.: US 11,679,571 B2
(45) Date of Patent: Jun. 20, 2023

(54) METHOD FOR PRODUCING A TIRE PROVIDED WITH A RADIOFREQUENCY COMMUNICATIONS MODULE

(71) Applicant: COMPAGNIE GENERALE DES ETABLISSEMENTS MICHELIN, Clermont-Ferrand (FR)

(72) Inventors: Luc Bestgen, Clermont-Ferrand (FR); Henri Hinc, Clermont-Ferrand (FR); Severine Glibert, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 17/056,324

(22) PCT Filed: May 16, 2019

(86) PCT No.: PCT/FR2019/051120
§ 371 (c)(1),
(2) Date: Nov. 17, 2020

(87) PCT Pub. No.: WO2019/220063
PCT Pub. Date: Nov. 21, 2019

(65) Prior Publication Data
US 2021/0252815 A1    Aug. 19, 2021

(30) Foreign Application Priority Data

May 17, 2018 (FR) ...................... 1854102

(51) Int. Cl.
*B29D 30/00* (2006.01)
(52) U.S. Cl.
CPC .. *B29D 30/0061* (2013.01); *B29D 2030/0077* (2013.01); *B29D 2030/0083* (2013.01)

(58) Field of Classification Search
CPC .... B29D 2030/0083; B29D 2030/0077; B60C 23/0493; B60C 2013/005; B60C 2019/004
See application file for complete search history.

(56) References Cited

U.S. PATENT DOCUMENTS 9,070,069 B2   6/2015  Sinnett
9,114,671 B2   8/2015  Adamson et al.
(Continued)

FOREIGN PATENT DOCUMENTS

CN   107683214 A      2/2018
DE   102004002150 A1 * 8/2005   ............... B26D 3/06
(Continued)

OTHER PUBLICATIONS

ESpaceNet Translation of WO2018077501 (Year: 2021).*
(Continued)

*Primary Examiner* — Robert C Dye
*Assistant Examiner* — Alexander D Booth
(74) *Attorney, Agent, or Firm* — Venable LLP

(57) ABSTRACT

A method for manufacturing a tire (1) equipped with a communication module (20) consists in successively, and in the order required by the architecture of said tire, laying rubber products, notably profiled elements (50) and reinforcing elements on a given support in order to yield a green tire (1), then in vulcanizing the green tire to yield a tire (1), wherein, prior to laying one of the rubber profiled elements (50) on the green tire, a slot (52) is created starting from a surface of the rubber profiled element (50) and the communication module (20) is introduced into the slot (52).

9 Claims, 7 Drawing Sheets

(56) References Cited

U.S. PATENT DOCUMENTS

| | | | |
|---|---|---|---|
| 10,339,435 | B2 | 7/2019 | Destraves |
| 10,919,344 | B2 | 2/2021 | Tamura |
| 2008/0289736 | A1* | 11/2008 | Adamson ............ B60C 23/0493 152/152.1 |
| 2011/0226401 | A1 | 9/2011 | Battocchio et al. |
| 2013/0153669 | A1 | 6/2013 | Sinnett |
| 2014/0261944 | A1 | 9/2014 | Papakonstantopoulos et al. |
| 2014/0326386 | A1* | 11/2014 | Sato ..................... B60C 19/086 152/525 |
| 2017/0225524 | A1* | 8/2017 | Tamura ............... B60C 23/0493 |
| 2017/0341323 | A1 | 11/2017 | Destraves et al. |
| 2018/0174015 | A1* | 6/2018 | Destraves ........ G06K 19/07764 |
| 2019/0322142 | A1* | 10/2019 | Lallement .......... B29D 30/0061 |
| 2020/0108676 | A1* | 4/2020 | Suita ..................... B60C 23/064 |

FOREIGN PATENT DOCUMENTS

| | | | |
|---|---|---|---|
| EP | 1977912 | A1 | 10/2008 |
| EP | 2361790 | A1 | 8/2011 |
| EP | 2777958 | A1 | 9/2014 |
| EP | 3196056 | A1 | 7/2017 |
| WO | 2012/030321 | A1 | 3/2012 |
| WO | 2016/193457 | A1 | 12/2016 |
| WO | 2018/077501 | A1 | 5/2018 |

OTHER PUBLICATIONS

ESpaceNet Translation of DE102004002150 (Year: 2023).*
International Search Report dated Jan. 8, 2020, in corresponding PCT/FR2019/051120 (6 pages).

* cited by examiner

METHOD FOR PRODUCING A TIRE PROVIDED WITH A RADIOFREQUENCY COMMUNICATIONS MODULE

FIELD OF THE INVENTION

The present invention relates to tyres, and more particularly to a tyre equipped with a radio-frequency communication module.

PRIOR ART

A tyre of the heavy goods vehicle type, equipped with a radio-frequency communication module is already known from the prior art, notably from EP 1 977 912 B1. In that document, the radio-frequency communication module comprises a passive radio-frequency identification transponder equipped with a helical radiating antenna forming a dipole. This type of transponder is generally known by the acronym RFID. Such a transponder is able to store data, for example relating to the identity, to the type and/or to the date of manufacture of the tyre.

Document WO 2016/193457 A1 discloses a communication module comprising a passive radio-frequency transponder comprising a primary antenna electrically connected to an electronic chip and inductively coupled to a dipole radiating antenna made up of a single-strand helical spring and the primary antenna being arranged inside the single-strand helical spring of the radiating antenna. This communication module has no mechanical connection between the radiating antenna and the electronic chip, thereby appreciably improving its in-service ability to withstand harsh conditions such as those experienced within a tyre structure.

BRIEF DESCRIPTION OF THE INVENTION

The subject of the invention is a method for manufacturing a tyre equipped with a communication module, consisting in successively, and in the order required by the architecture of the tyre, laying rubber products, notably profiled elements and reinforcing elements on a given support in order to yield a green tyre, then in vulcanizing the green tyre to yield a tyre, the communication module comprising the radio-frequency transponder comprising a primary antenna electrically connected to an electronic chip and inductively coupled to a dipole radiating antenna consisting of a single-strand helical spring and the primary antenna being arranged inside the single-strand helical spring of the radiating antenna. This method is characterized in that, prior to laying one of the rubber profiled element on the green tyre, a slot is created starting from a surface of the rubber profiled element and the communication module is introduced into the slot.

The slot at the surface of the rubber profiled element can be created independently of the operations of building the green tyre.

In this embodiment, the slot is produced in the chosen profiled element at the end of preparation of said profiled element and before or during the transfer of same toward the green tyre building device. When the profiled element arrives for laying on the green tyre, it already has a slot for the insertion of a communication module and it may already have a communication module in the slot.

What is meant here by "slot" is an opening situated at the surface of the profiled element which is both narrow and elongate at the surface of the profiled element and which is deep into the thickness of the profiled element.

This slot, because of its elongate shape, allows easy and guided insertion of the communication module along a main dimension of the communication module, encouraging correct orientation of the communication module within the profiled element. Because of its depth in the thickness of the profiled element, it allows the communication module to be fully inserted into the profiled element. This ensures that the communication module becomes encapsulated in the material of which the profiled element is made, providing it with mechanical insulation and possibly also electrical insulation. In addition, the combination of an opening that is elongate at the surface and deep into the thickness also ensures controlled orientation of the communication module within the profiled element. Finally, because of its narrowness, the slot is able to retain the communication module which has been initially inserted mechanically in its entirety into the slot. This then ensures control of the positioning of the communication module within the profiled element throughout the tyre manufacturing cycle.

Further, the step of inserting the communication module into the profiled element may also take place away from the tyre production line, making it possible to save cycle time in the manufacture of the tyre equipped with such a communication module. In addition, this profiled element may also be the result of a complexing and/or of a coextrusion of several profiled elements and/or reinforcing elements upstream, and this too improves the productivity of the manufacture of such a tyre. Specifically, the operations of laying the various profiled elements individually, which would have been required for introducing the communication module at the interface between two profiled elements, is then eliminated.

Finally, the complete insertion of the communication module inside the profiled element improves the mechanical endurance of the tyre because the communication module, which constitutes a mechanical singularity within the tyre, is no longer situated at the interface between profiled elements and/or reinforcing elements. As a result, the communication module is distanced from all the radial ends of the profiled elements or of the reinforcing elements which also potentially constitute singularities of stiffness within the tyre. Keeping these singularities distant from one another is beneficial for the endurance of the tyre.

The slot may also be produced during the building of the green tyre.

In that case, the slot is created and the communication module is inserted just before the profiled element is laid on the green tyre.

In both instances, this slot can be created easily and quickly using an ultrasound cutting device for example.

This method allows the communication module to be positioned simply and accurately at the chosen location of the tyre structure.

According to a first embodiment, the communication module may consist of a radio-frequency transponder. In that case, the radio-frequency transponder is placed inside the slot of the rubber profiled element without being encapsulated with insulating rubber compound. This has the advantage of reducing the cost of the communication module because the step of preparing a semi-finished product consisting of the transponder encapsulated in non-vulcanized insulating rubber compound is omitted.

It is particularly advantageous, when use is made of a bare radio-frequency transponder, which means to say one that is not encapsulated with a rubber compound, to situate this inside a rubber profiled element rather than at the interface between two adjacent rubber compounds. This enhances the mechanical strength of the structure as a whole.

The compound of the rubber profiled element in which the slot is produced is preferably electrically insulating.

The compound of the rubber profiled element comprising a slot may also not be electrically insulating. It is well known that the absence of a layer of electrically insulating rubber compound reduces the effectiveness of the radiating antenna of the radio-frequency transponder, but the use of a radio-frequency transponder like the one described in document WO 2016/193457 A1, because of its better mechanical strength and its excellent potential for communication with an external reader, allows it to be situated in positions where this communication is facilitated, while at the same time maintaining an excellent service life and good ability to communicate with an external reader.

According to a second embodiment of the method according to one of the subject matters of the invention, the communication module consists of a radio-frequency transponder encapsulated in a mass of electrically insulating encapsulating rubber. This embodiment improves the effectiveness of the radiating antenna of the radio-frequency transponder.

Advantageously, the radio-frequency transponder is sheathed with electrically insulating encapsulating rubber and the communication module, ready to be placed in the tyre, has a geometry exhibiting an axis of rotational symmetry.

It is advantageous to use a communication module or semi-finished product that is cylindrical in shape for inserting the communication module into the slot, because of the greater ease of manipulation and placement: the only requisite being to correctly orientate to the axis of symmetry of the semi-finished product.

Advantageously, the communication module is inserted into the slot of the profiled element in such a way that the axis defined by the radiating antenna is oriented circumferentially.

This orientation is perpendicular to the threads of the carcass reinforcement of a radial tyre and is very favourable in terms of the mechanical integrity of the transponder and in terms of the quality of reading of the transducer using an external reader.

According to one advantageous embodiment, the tyre comprises a radial carcass reinforcement consisting of at least one carcass reinforcement layer formed of reinforcing elements inserted between two skim layers of rubber compound, a crown reinforcement, itself capped radially by a tread. The tread is connected to two beads by two sidewalls. The layer of reinforcing elements of the carcass reinforcement is anchored in each of the beads by being turned up around a bead wire to form a main part of the carcass reinforcement layer in each of the beads. The turn-up of the carcass reinforcement layer is separated from the main part of the carcass reinforcement layer by a first layer of rubber compound extending radially externally from the bead wire. A second layer of rubber compound forms the external surface of the tyre in the region of the bead. The second layer of rubber compound, notably intended to come into contact with the rim, is, radially towards the outside, in contact with a third layer of rubber compound that forms the exterior surface of the sidewall.

This is a conventional architecture of tyre able to accommodate a communication module within its structure, particularly in one of its beads or of its sidewalls.

According to one particular embodiment, the slot is created starting from the surface of the profiled element of the second or of the third layer of rubber compound, radially on the outside relative to the bead wire.

The second and third layers of rubber compound are situated axially on the outside relative to the carcass ply. The communication module is embedded in a uniform compound close to the external surface of the tyre which favours radio-frequency communication. Of course, the communication module should be kept away from the bead wire which, being metallic and close to the rim which is often likewise metallic, perturbs the radioelectric waves.

According to one specific embodiment, the slot is created on a surface of the profiled element which is not an external surface of the tyre.

This then ensures that a profiled element and/or reinforcing element will form an interface with the surface of the profiled element comprising the slot when the green tyre is complete, so as to prevent any extraction of the communication module from the profiled element. That makes the positioning of the communication module during the course of the tyre manufacturing method more secure.

According to one highly advantageous embodiment, a fourth layer of rubber compound is laid axially between the turn-up of the carcass reinforcement layer and the second and third layers of rubber compound.

The fourth layer of rubber compound is an internal profiled element of the tyre, which means to say that the surfaces of the layer are situated on the inside of the tyre.

According to one particular embodiment, the slot is created starting from the surface of the profiled element of the fourth layer of rubber compound.

Thus, the communication module is embedded within the structure of the tyre, which affords it mechanical protection against attack external to the tyre. The fourth layer of rubber compound is a layer internal to the tyre, so the slot can therefore be produced independently on one or the other of the surfaces of the fourth layer of rubber compound, which means that this layer can be complexed with other layers via the surface that does/will not have the slot.

According to one specific embodiment, with the first layer of rubber compound extending radially to beyond the end of the turn-up of the carcass reinforcement layer, the slot is created starting from the surface of the profiled element of the first layer of rubber compound and the communication module is placed radially on the outside relative to the end of the turn-up of the carcass reinforcement layer.

Thus, because the first layer of rubber compound is positioned on the green form of the tyre being made with respect to the bead wire, the communication module can be positioned in the first layer of rubber compound before this layer is positioned on the green form of the tyre, thereby making it possible to improve the cycle time needed for producing the green form of such a tyre, or making it possible to position the communication module robustly with respect to the end of the turn-up of the carcass reinforcement layer which constitutes a singularity of stiffness in the tyre. In addition, the first layer of rubber compound is, by nature, an internal profiled element of the tyre.

DESCRIPTION OF THE FIGURES

The various objects of the invention will be better understood by means of the following detailed description together with the attached drawings, throughout which the same reference numbers have been used to reference identical parts, and in which drawings.

In order to make them easier to understand, the figures are not shown to scale.

DETAILED DESCRIPTION OF THE INVENTION

In what follows, the terms "rubber gum", "rubber compound", "rubber" and "compound" are used interchangeably to identify rubber constituents of the tyre.

The circumferential direction of the tyre, or longitudinal direction, is the direction corresponding to the periphery of the tyre and defined by the direction of running of the tyre.

The transversal or axial direction of the tyre is parallel to the axis of rotation of the tyre.

The radial direction is a direction which crosses the axis of rotation of the tyre and is perpendicular thereto.

The axis of rotation of the tyre is the axis about which it turns in normal use.

A radial or meridian plane is a plane which contains the axis of rotation of the tyre.

The circumferential median plane, or equatorial plane, is a plane perpendicular to the axis of rotation of the tyre and which divides the tyre into two halves.

Figure 1:
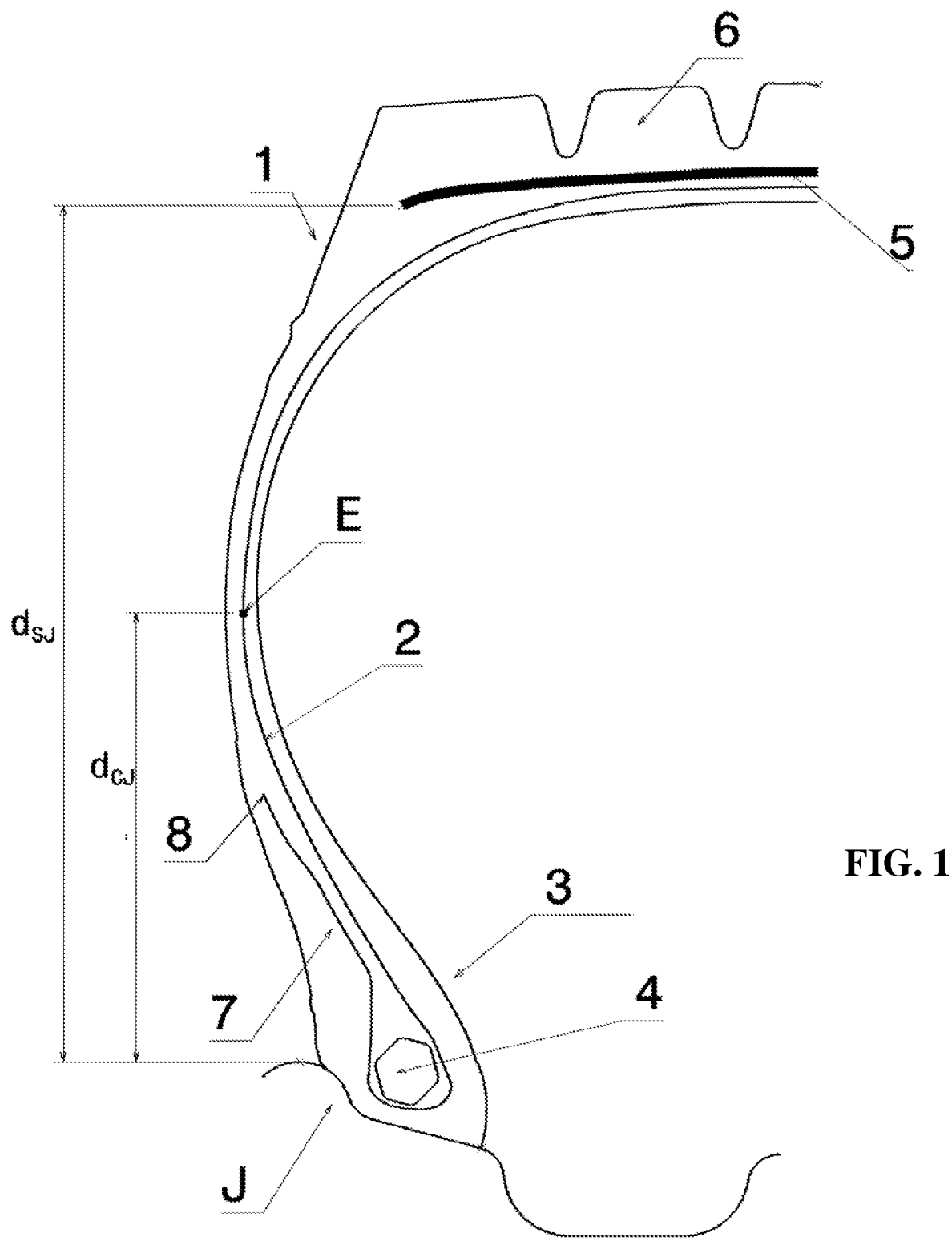
FIG. 1 illustrates a schematic meridian view of a tyre.

FIG. 1 shows a half-view of a tyre which extends symmetrically relative to the circumferential median plane, or equatorial plane, of a tyre.

In FIG. 1, the tyre 1 is of size 12 R 22.5. The tyre 1 comprises a radial carcass reinforcement 2 anchored in two beads 3. The carcass reinforcement 2 is hooped at the crown of the tyre by a crown reinforcement 5, itself capped by a tread 6.

The carcass reinforcement 2, formed by a single layer of metal cords, is wound, in each of the beads 3, around a bead wire 4 and forms, in each of the beads 3, a turn-up of the carcass reinforcement layer 7 having an end 8.

The carcass reinforcement 2 is formed of reinforcing elements between two skim layers.

FIG. 1 illustrates the tyre fitted on its nominal rim J; the axially outermost point E of the main part of the carcass reinforcement layer 2 is thus determined with the tyre inflated to its nominal pressure, for example by tomography.

Figure 2:
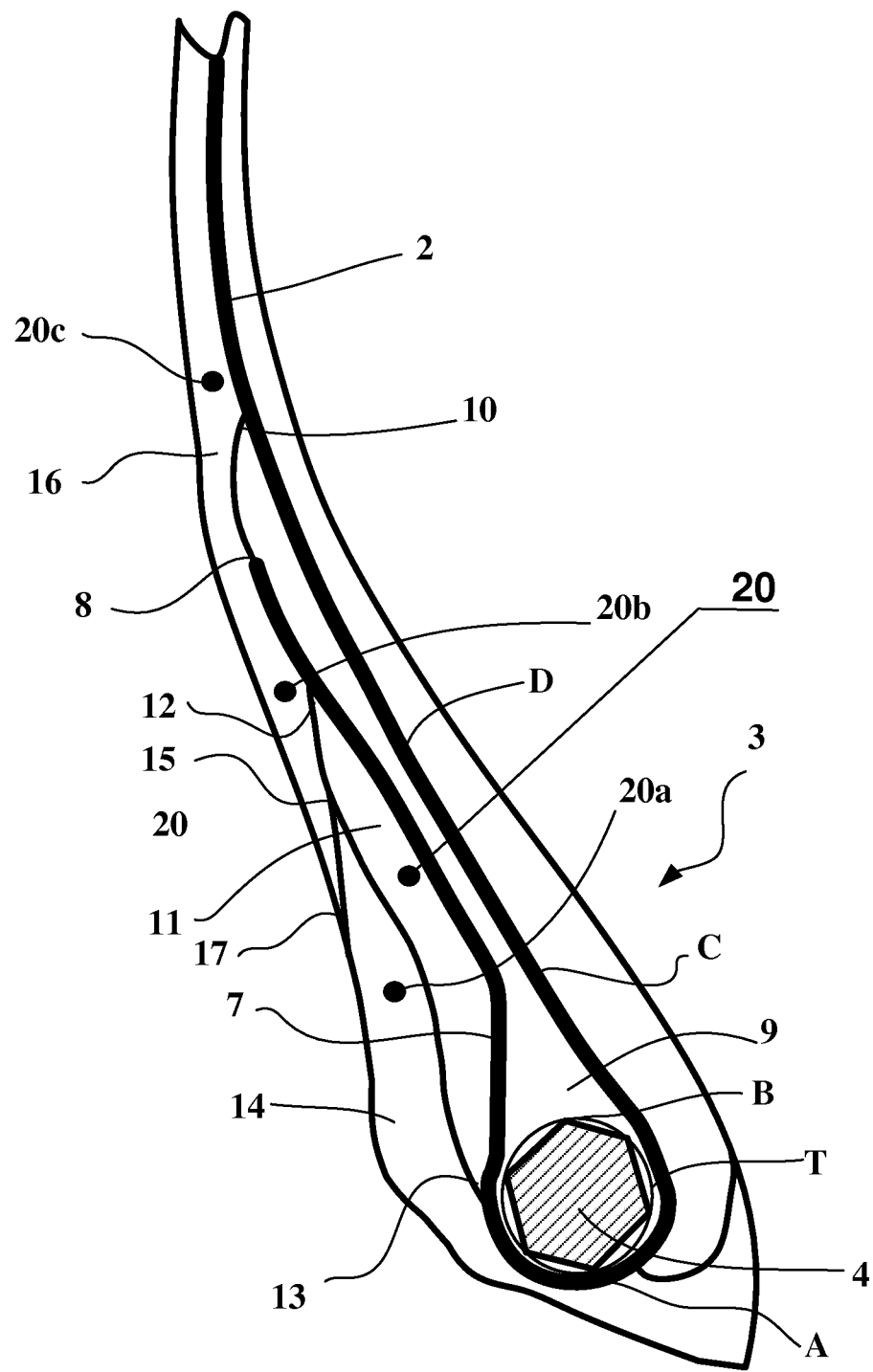
FIG. 2 is a schematic depiction of the bead region of a tyre according to a first embodiment of the invention.

FIG. 2 illustrates, in an enlargement, a schematic cross-sectional depiction of a bead 3 of the tyre of FIG. 1 in which a part of the carcass reinforcement layer 2 is wound around a bead wire 4 in order to form a turn-up 7 having an end 8.

The turn-up 7 of the carcass reinforcement layer 2 is separated from the main part of the carcass reinforcement layer 2 by a first layer of rubber compound 9 having a radially outer end 10.

The first layer of rubber compound 9 is profiled in order to bear against the bead wire 4 and ensure the coupling and decoupling between the turn-up of the carcass reinforcement layer 7 and the main part of the carcass reinforcement layer 2.

Shown axially on the outside of the turn-up 7 of the carcass reinforcement layer is a fourth layer of rubber compound 11, the radially outer end 12 of which is radially on the inside of the end 8 of the turn-up 7 of the carcass reinforcement layer. According to another embodiment which has not been depicted, the radially outer end of the fourth layer of rubber compound is radially on the outside of the end 8 of the turn-up 7 of the carcass reinforcement layer.

The radially inner end 13 of the fourth layer of rubber compound 11 is radially comprised between the points A and B, which are the radially innermost and radially outermost points, respectively, of the circle circumscribed on the bead wire T.

In contact with the fourth layer of rubber compound 11 and radially under the bead wire, there is a second layer of rubber compound 14, the axially outermost end 15 of which is radially on the inside of the end 12 of the fourth layer of rubber compound 11.

Axially in contact with the first layer of rubber compound 9, with the fourth layer of rubber compound 11, and with the second layer of rubber compound 14, there is a third layer of rubber compound 16. The radially inner end 17 of the third layer of rubber compound 16 is radially on the inside of the end 15 of the second layer of rubber compound 14.

The bead 3 also comprises a radio-frequency communication module 20 arranged axially on the outside relative to the interface between the carcass reinforcement turn-up 7 and the fourth layer of rubber compound 11. This communication module 20 is positioned radially at the region of coupling between the main part 2 of the carcass reinforcement and the turn-up 7 of this carcass reinforcement, namely between the two points C and D in FIG. 2. The communication module 20 is preferably arranged substantially in the middle of this coupling region, between C and D. The communication module 20 is embedded inside the fourth layer of rubber compound 11 at a distance greater than 2 mm and preferably greater than 3 mm from the interface.

This position affords the radio-frequency transponder of the communication module good mechanical protection and the Applicant has found experimentally that the distance greater than 2 mm from the metal threads of the turn-up 7 of the carcass reinforcement 2 provides good robustness of communication with an external reader even if the reading distances are practically identical or very similar compared with a communication module arranged at the interface between the turn-up 7 and the fourth layer of rubber compound. The reading distance is thus less subject to the random features of industrial scale manufacture than when the communication module is placed directly at the interface between the second communication layer and the skim layer of the layer of metal reinforcers of the turn-up 7.

FIG. 2 also shows communication modules 20a, 20b and 20c placed in alternative positions. The communication module 20a is embedded inside the second layer of rubber compound radially on the outside relative to the point B; the communication modules 20b and 20c are both embedded in the third layer of rubber compound, the one that forms the surface of the sidewall of the tyre. These last two positions are highly beneficial from the viewpoint of communication between the communication module and an external reader, and of very good mechanical strength of the communication module that allows it to withstand the particularly harsh in-service mechanical stresses in the vicinity of the point E on the sidewall in particular.

Figure 6:
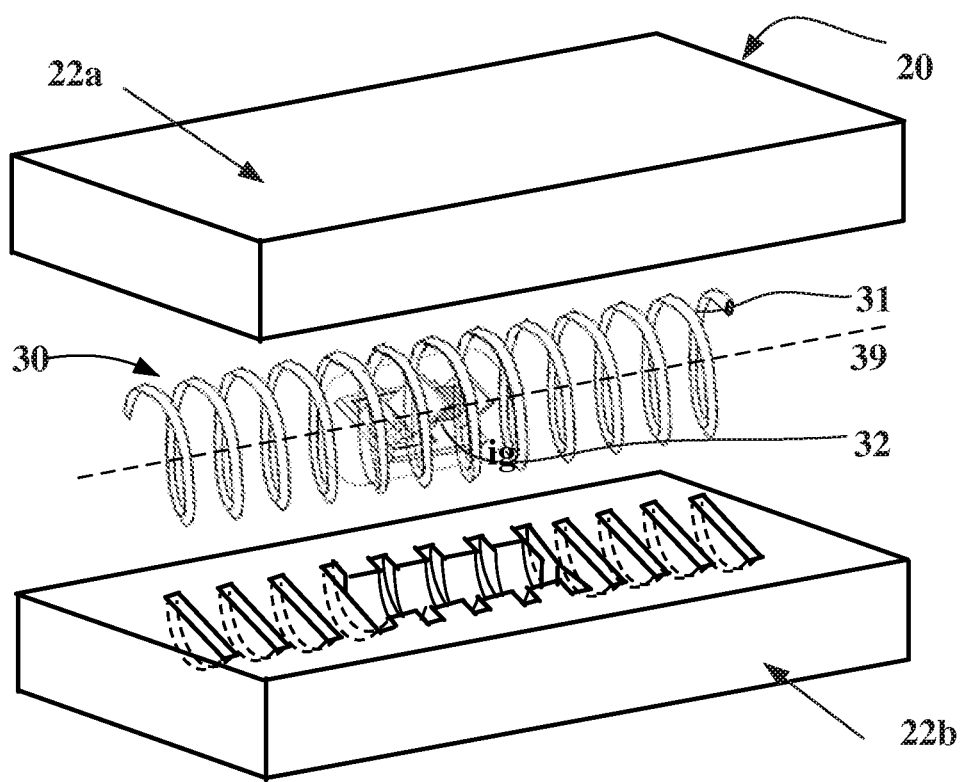
FIG. 6 is a schematic exploded view of a communication module.

FIG. 6 is an exploded view of a communication module 20. This module 20 comprises a radio-frequency transponder 30 embedded between two layers 22*a* and 22*b* of a non-vulcanized electrically insulating rubber compound. The thickness of each layer is of the order of 1 to 2 mm, the length is of the order of 50 to 70 mm and its width is of the order of 10 to 20 mm. Such a communication module is a semi-finished product that can be incorporated into the structure of the tyre 1 during the manufacture of the latter.

The rubber compound 22 for encapsulating the radio-frequency transponder 30 contains 100 phr (parts by weight per 100 parts of rubber) of a polymer such as EPDM (ethylene propylene diene monomer rubber), butyl rubber, neoprene or a diene elastomer such as SBR (styrene-butadiene rubber), polybutadiene, natural rubber or polyisoprene.

The compound may contain fillers such as silica, carbon black, chalk and kaolin fillers:
- with a silica filler in a maximum amount of 50 phr;
- with a carbon black filler of ASTM grade higher than 700, in an amount lower than 50 phr;
- with a carbon black filler of grade lower than or equal to 500, in a maximum amount of 20 phr.
- It is possible to add or replace these fillers with chalk or kaolin.

Such amounts and types of fillers make it possible to guarantee a relative permittivity lower than 6.5, in particular at a frequency of 915 MHz.

The stiffness in the cured state of the encapsulating compound is preferably lower than or close to those of the adjacent rubber compounds.

Figure 7:
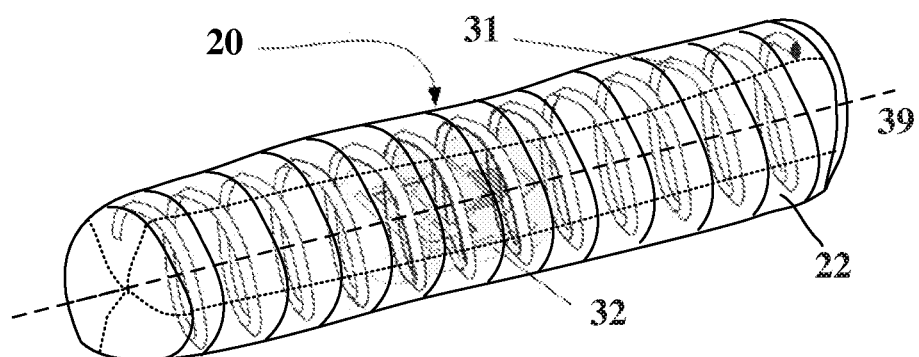
FIG. 7 is a schematic view of a communication module of cylindrical shape.

FIG. 7 shows an alternative embodiment of the communication module 20. In this embodiment, the radio-frequency transponder 30 is embedded in an electrically insulating rubber compound 22 and the assembly has a substantially cylindrical shape. The outside diameter of the radiating antenna 31 is of the order of 2 mm, and advantageously, the thickness of the layer of electrically insulating rubber between the exterior surface of the radiating antenna 31 and the exterior surface of the communication module is of the order of 1 mm. The semi-finished product or communication module 20 ready to be inserted into the slots in the profiled elements of suitable rubber compound therefore has a diameter of the order of 4 mm with a length of the order of 50 mm.

The radio-frequency transponder 30 of the communication module 20 such as shown in FIGS. 6 and 7 corresponds to the one described in document WO 2016/193457 A1, that will now be described.

The radio-frequency transponder 30 according to this embodiment of the communication module 20 comprises an electronic portion 32 and a radiating antenna 31 able to communicate with an external radio-frequency reader. It additionally comprises (see FIG. 8) a primary antenna 34 electrically connected to the electronic chip 36 and inductively coupled to the radiating antenna 31. The radiating antenna is a dipole antenna consisting of a single-strand helical spring defining a first longitudinal axis 39.

FIGS. 6 and 7 show a radio-frequency transponder 30 in a preferred configuration in which the electronic portion 32 is located inside the radiating antenna 31. The geometric shape of the electronic portion 32 is circumscribed in a cylinder the diameter of which is smaller than or equal to the inside diameter of the helical spring. The introduction of the electronic portion 32 into the radiating antenna 31 is facilitated thereby. The median plane of the primary antenna is located in the central region of the radiating antenna and substantially superposed on the median plane of the radiating antenna.

It is also possible to arrange the electronic portion on the outside of the radiating antenna 31.

Figure 8:
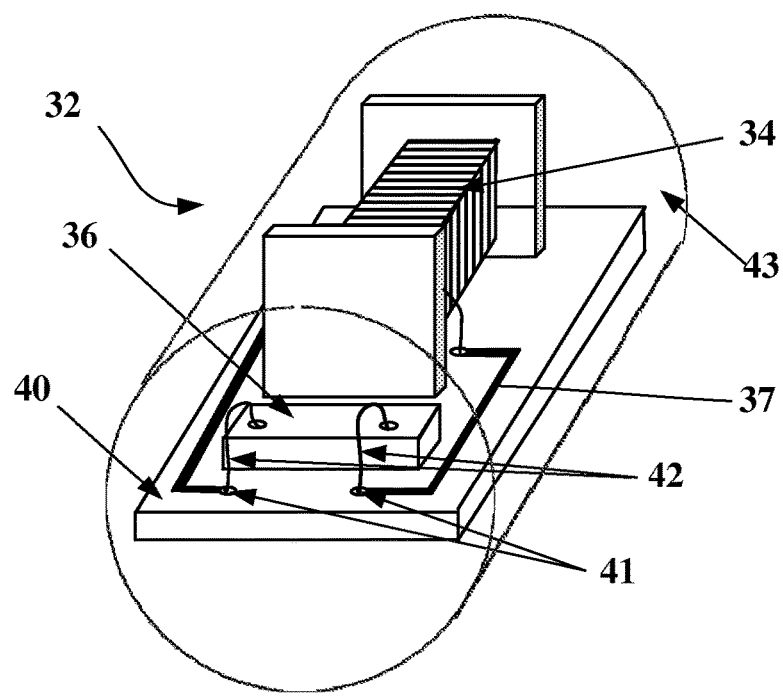
FIG. 8 is a perspective view of the electronic part of a radio-frequency transponder.

FIG. 8 shows the electronic portion 32 of a radio-frequency transponder 30 intended for a configuration in which the electronic portion 32 is located in the interior of the radiating antenna 31. The electronic portion 32 comprises an electronic chip 36 and a primary antenna 34 that is electrically connected to the electronic chip 36 via a printed circuit board 40. The primary antenna here consists of a surface-mount-device (SMD) microcoil. The components on the printed circuit board are electrically connected using copper tracks 37 terminated by copper pads 41. The components on the printed circuit board are electrically connected using the wire-bonding technique by gold wires 42 running between the component and the pads 41. The assembly consisting of the printed circuit board 40, of the electronic chip 36 and of the primary antenna 34 is embedded in a rigid mass 43 made of electrically insulating high-temperature epoxy resin forming the electronic portion 32 of the radio-frequency transponder 30.

This radio-frequency transponder 30 has the advantage of being mechanically far stronger than conventional transponders.

Methods for installing a communication module 20 embedded inside the fourth layer of rubber compound are now described. The methods corresponding to the other three positions shown in FIG. 2 are entirely similar.

According to a first method for building a green form of tyre comprising a radio-frequency communication module 20:
- a cylindrical green form comprising an annular bead wire interposed between an annular carcass reinforcement and a first layer of rubber compound is manufactured,
- a part of the carcass reinforcement is folded around the bead wire onto the first layer of rubber compound to form a turn-up of the carcass reinforcement; and
- a second profiled element consisting of at least a fourth layer of rubber compound which, comprises a communication module embedded within it, is applied to the turn-up.

Advantageously, before the second profiled element is laid on the turn-up of the carcass reinforcement, a slot is created starting from the surface of the fourth layer of rubber compound and the communication module or, as the case may be, the radio-frequency transponder, is introduced into the slot.

Figure 9:
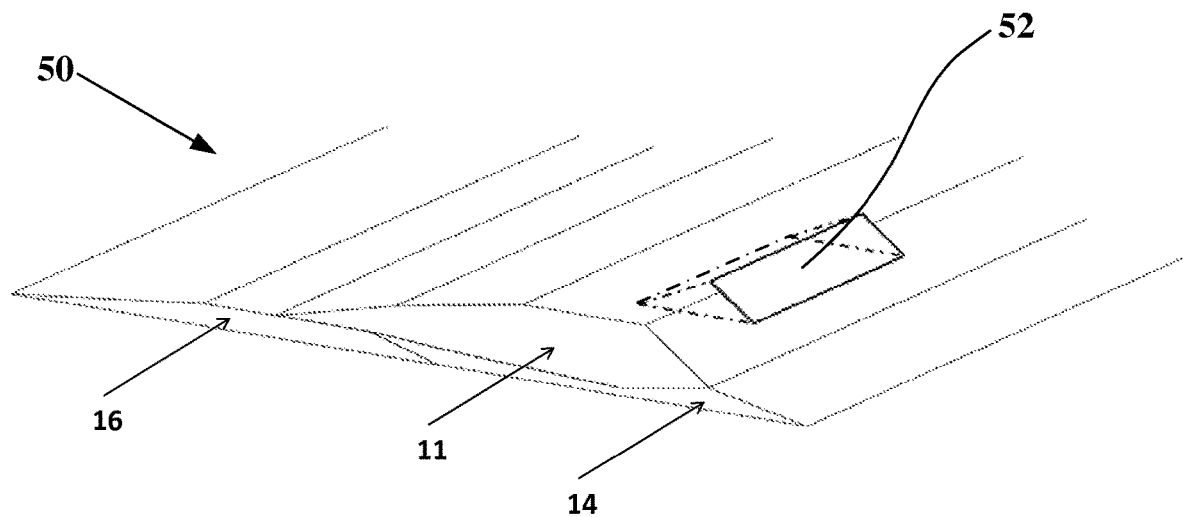
FIG. 9 shows a profiled element of rubber compounds intended to be applied to a green tyre.

As illustrated in FIG. 9, it is possible when building the tyre to use a complex profiled element 50 and it is then very easy, before placing this complex, to create, for example by means of an ultrasound cutting device, a slot of dimensions and orientation suited to the rapid and repeatable placement of the radio-frequency transponder and, where appropriate, of its encapsulating rubbers.

This profiled element 50 comprises, on the free surface of the fourth rubber compound 11, which surface is intended to come to bear against the turn-up of the carcass reinforcement, a slot 52 of dimensions suited to accommodating a communication module as depicted in FIGS. 6 and 7. The slot 52 is also produced in such a way that the axis of symmetry 39 defined by the radiating antenna of the passive radio-frequency transponder of the communication module is oriented circumferentially. This slot 52 is produced using an ultrasound cutting device or vibrating blade defining an incision, for example in the shape of a U on the exterior surface of the complex profiled element 50 made up of two arms and a base. The orientation of the cutting device changes according to the altitude of the arms of the U so as to describe a radius about a fixed axis of the profiled element. Thus is created a V-shaped slot 52 or incision that may be seen in dotted line. This slot 52 opens by pivoting of the material about axis joining the two free ends of the U so that the communication module can be inserted into the slot 52 and so that the slot 52 can close again over the communication module when the latter is positioned in the slot. The profiled element 50 is then pressed down using a wheel in the region of the slot 52 in order to create anew a connection at the disjointed portions of the profiled element which are delimited by the slot 52 once the communication module has been introduced into the profiled element 50.

As a preference, this slot 52 is oriented circumferentially when the profiled element 50 mounted on the green form of the tyre is shaped. The slot 52 has a long dimension in the future circumferential direction, which is parallel to the first longitudinal axis of the radiating antenna of the radio-frequency transponder. The depth of the slots 52 into the thickness of the profiled element 50 allows the radio-frequency transponder to be introduced to a depth of at least 2 millimetres from the exterior surface of the profiled element 50 that comprises the slot 52. The slot 52 will be covered over by the carcass reinforcing layer turn-up in the case of the architecture of the tyre of FIG. 2. This will prevent any movement of the communication module within the profiled element 50 when the green form of the tyre is being manipulated up to the point at which the tyre in the cured state is finally completed.

According to another method for building the tyre:
an inner rubber is placed on a cylindrical drum;
the profiled elements of the second, third and fourth layers of rubber compound are applied in succession or as a complex;
the two bead wires and the two profiled elements of the first layer of rubber compound are laid;
the carcass is shaped to press it firmly against the interior surface of the two bead wires and profiled elements of the first layer;
the second, third and fourth layers of rubber compound are folded around the bead wire and folded down onto the first layer of rubber compound; and
the manufacture of the green form of the tyre is completed then this green form is vulcanized to yield a tyre.

This method is such that before the second, third and fourth layers of rubber compound are folded around the bead wire, a slot is created starting from the surface of the profiled element of the fourth layer of rubber compound and the communication module is introduced into the slot.

In the aforementioned two methods for building a green form of a tyre, the slot at the surface of the fourth layer of rubber compound can be created before the profiled element is placed on the green form of the tyre or during this building of the green form of the tyre.

It is advantageous to use a semi-finished product that exhibits cylindrical symmetry for inserting the communication module into the slot, because of the greater ease of manipulation and placement: the only requisite being to correctly orientate to the axis of symmetry of the semi-finished product.

Such a semi-finished product with an axis of rotational symmetry is shown in FIG. 7.

Figure 3:
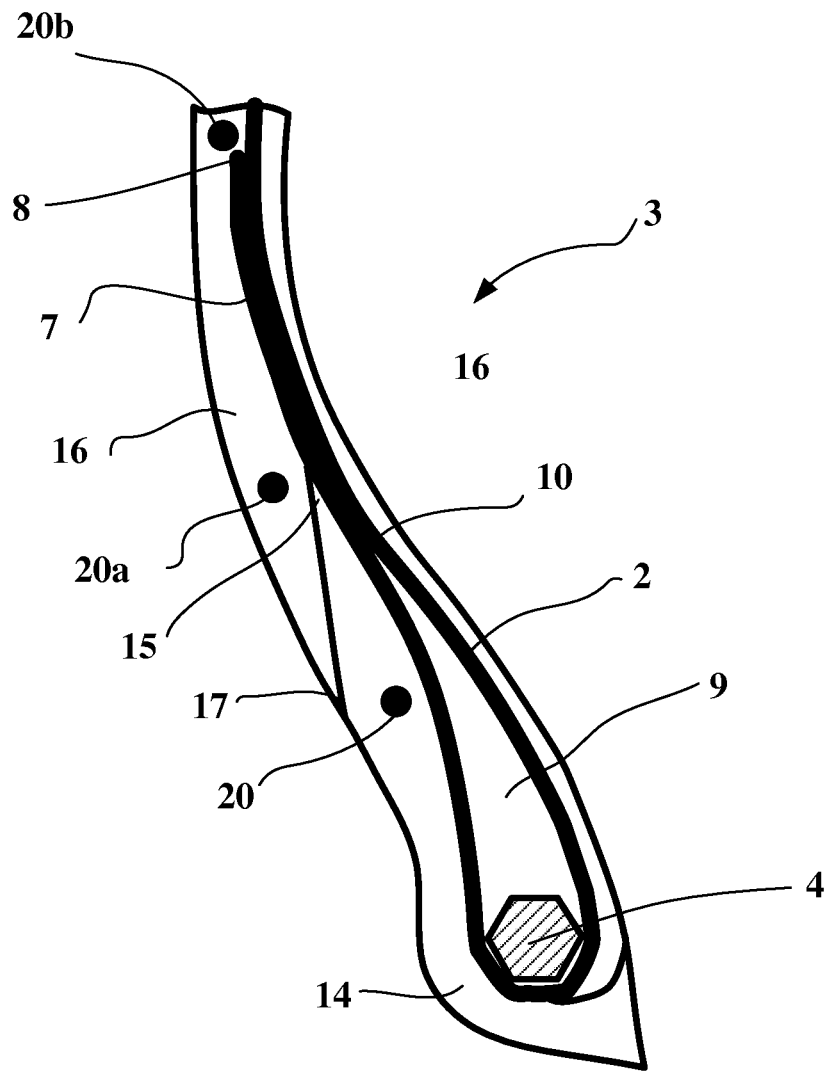
FIG. 3 is a schematic depiction of the bead region of a tyre according to a second embodiment of the invention.

FIG. 3 shows a bead 3 of a tyre, chiefly for passenger vehicles. The carcass reinforcement 2 is anchored in the bead 3 by being turned up around the bead wire 4. The carcass reinforcement reinforcing threads are textile threads; the first layer of compound 9 separates the main part of the carcass reinforcement 2 from the turn-up 7. The turn-up 7 of the carcass reinforcement 2 extends up in the sidewall region beyond the radially exterior end of the first layer of compound 9. The second layer of compound 14, the layer that is in contact with the rim when the tyre is mounted thereon, and the third layer of compound 16 that forms the exterior surface of the tyre in the sidewall region, are in direct contact with the turn-up 7. There is no fourth layer of rubber compound. This bead comprises a communication module 20 embedded in the second layer of rubber compound at a position that is radially exterior in relation to the bead wire 4 so as to be radially on the outside of the flange of the rim J once the tyre has been mounted, so as to ensure good communication between the communication module and an external reader. This figure also shows two alternative positions 20a and 20b in which the communication module is embedded in the third layer of rubber compound. As before, these two positions are rendered possible on account of the good mechanical strength of the communication module used.

Figure 4:
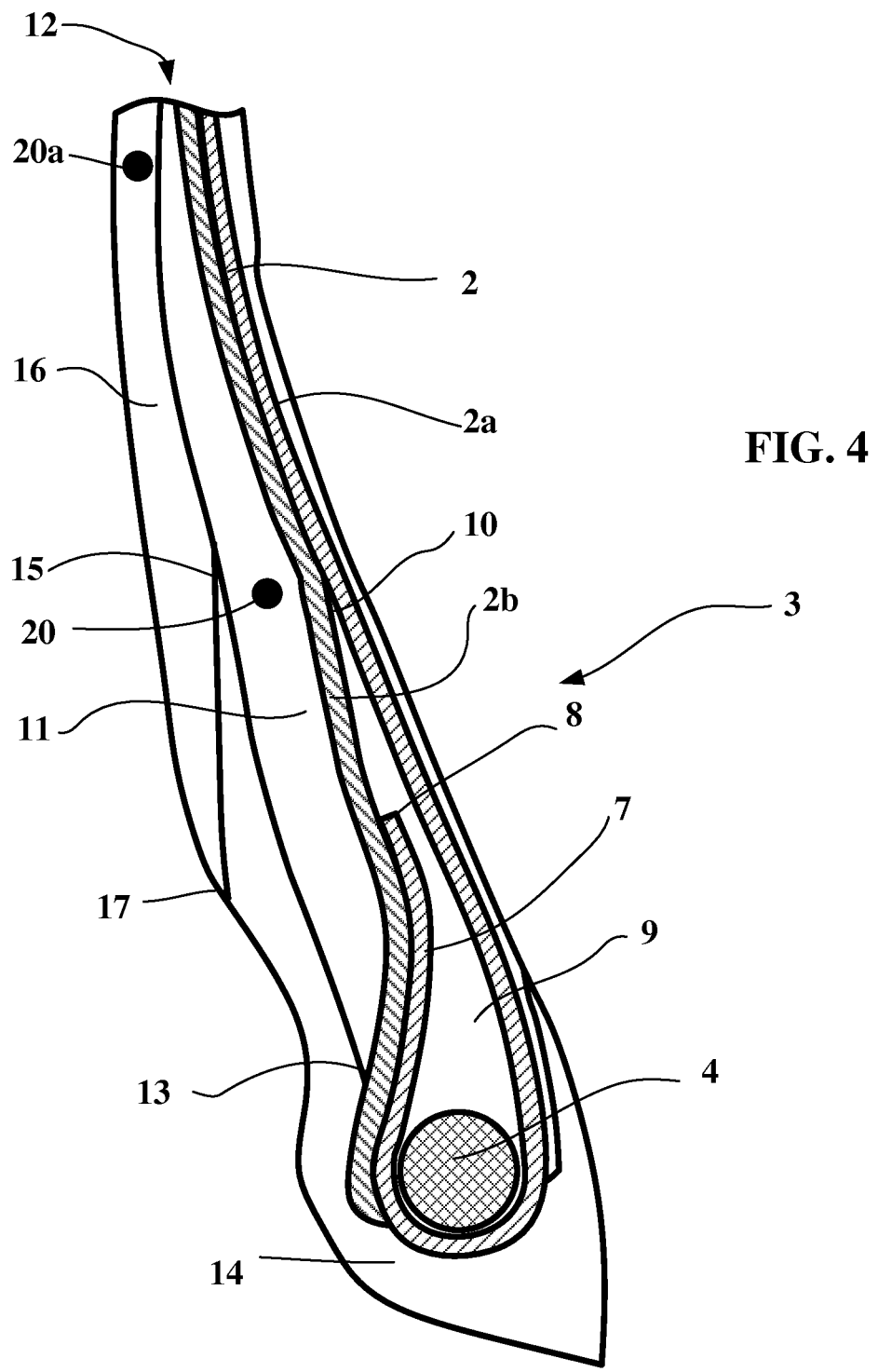
FIG. 4 is a schematic depiction of the bead region of a tyre according to a third embodiment of the invention.

FIG. 4 shows a bead 3 of a tyre, chiefly for vehicles of the van type. The carcass reinforcement 2 of the bead of this tyre is made up of two carcass plies 2a and 2b. The ply 2a is anchored around the bead wire 4 by a turn-up 7, and the ply 2b is positioned externally relative to the ply 2a. The two plies 2a and 2b are adjacent as far as the bead, where the ply 2b comes into contact axially on the outside with the turn-up 7. The first layer of rubber compound 9 is thus applied between the main part of the ply 2a and its turn-up 7 followed radially on the outside by the second ply 2b. This bead comprises a fourth layer of rubber compound 11 applied axially between the second ply 2b and the second 14 and third 16 layers of rubber compound. This bead comprises a communication module 20 preferably embedded in the fourth layer of rubber compound 11 and very preferably radially at the level of the radially outer end 10 of the first layer of rubber compound 9. This figure shows an alternative position for the communication module 20a. This position is embedded in the third layer of rubber compound 16 in the vicinity of the point E (see FIG. 1).

Figure 5:
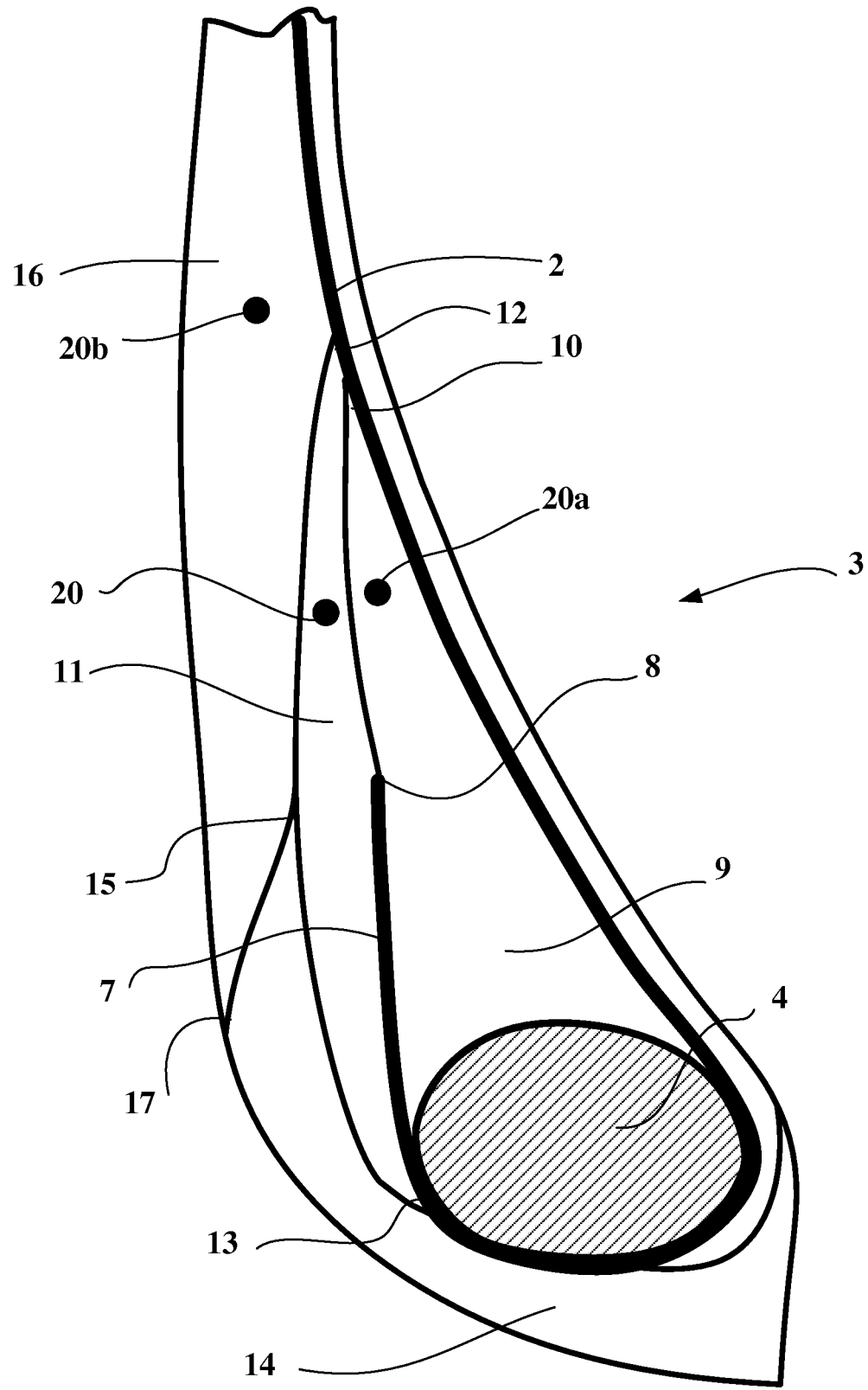
FIG. 5 is a schematic depiction of the bead region of a tyre according to a fourth embodiment of the invention.

FIG. 5 shows a tyre bead 3 usually used for heavy duty vehicles, in which the carcass reinforcement 2 comprises metal reinforcing threads and in which the end 8 of the turn-up 7 is positioned radially on the inside relative to the radially exterior end of the first layer of rubber compound 9. This bead 3 comprises, as in the examples of FIGS. 2 and 4, a fourth layer of rubber compound 11 positioned axially between the first layer of rubber compound 9 and the second 14 and third 16 layers of rubber compound. This FIG. 5 shows the preferred position of the communication module 20: embedded in the fourth layer of rubber compound 11 radially on the outside relative to the end 8 of turn-up 7 of the carcass reinforcement, or of any metal reinforcer that might be present in the bead 3, so as to guarantee good electromagnetic communication.

Note the alternative position 20a for the communication module, in which position said module is embedded in the first layer of rubber compound 9. This position is very well protected mechanically, but also sufficiently distant from the carcass reinforcement (the communication module should preferably be at a distance greater than 2 mm and highly preferably of 3 mm away from the metal reinforcers) to guarantee industrially robust communication of the communication module with an external reader. The best position illustrated as 20 or 20a will be selected according to the actual green tyre building method in order to disrupt this building as little as possible.

This FIG. 5 also shows a second alternative position for the communication module 20b, embedded in the third layer 16. As indicated previously, this position of the communication module is rendered possible because of the good resistance to stress loading of the communication module used.

In all the examples shown, it must be understood that each layer of rubber compound may comprise one or more layers of compound, of identical or different compound makeup, or may even contain metal or textile reinforcers if necessary.

Likewise, the examples given are nonlimiting and the method that forms the subject of the invention can be applied to any other type or field of application, such as notably to agricultural, construction plant, aircraft, tyres or to tyres for two-wheeled vehicles.

The method for inserting a communication module in a slot made in a profiled element before or whilst the constituent parts of the tyre are built into an assembly thus allows the communication module to be arranged in a large number of positions without disrupting the building of the green form of the tyre. This method is particularly advantageous when use is being made of a communication module that is cylindrical in shape with or without electrically insulating compound.

The invention claimed is:

1. A method for manufacturing a tire equipped with a communication module, the method consisting of successively, and in the order required by an architecture of the tire:
   laying rubber products including profiled elements and reinforcing elements on a support in order to yield a green tire; and then
   vulcanizing the green tire to yield a tire,
   wherein the communication module comprises a radio-frequency transponder comprising a primary antenna electrically connected to an electronic chip and inductively coupled to a dipole radiating antenna consisting of a single-strand helical spring,
   wherein, prior to laying one of the profiled elements, a slot is created starting from a surface of one of the profiled elements and the communication module is introduced into the slot and is encapsulated within the one of the profiled elements,
   wherein the tire comprises a radial carcass reinforcement made up of at least one carcass reinforcement layer formed of reinforcing elements inserted between two skim layers of rubber compound, a crown reinforcement, the crown reinforcement radially capped by a tread, the tread being connected to two beads by two sidewalls, the at least one carcass reinforcement layer being anchored in each of the beads by being turned up around a bead wire to form a main part of the at least one carcass reinforcement layer, extending from one bead wire to the other, and a turn-up of the at least one carcass reinforcement layer in each of the beads, the turn-up of the at least one carcass reinforcement layer being separated from the main part of the at least one carcass reinforcement layer by a first layer of rubber compound extending radially externally from the bead wire, a second layer of rubber compound that forms an exterior surface of the tire in a region of the bead, the second layer of rubber compound being intended to come into contact with a rim, and the second layer of rubber compound being, radially toward the outside, in contact with a third layer of rubber compound that forms an exterior surface of the sidewall, and
   wherein the slot is created starting from the surface of the one of the profiled elements of the second or the third layer of rubber compound, radially on the outside relative to the bead wire.

2. The method according to claim 1, wherein the slot at the surface of the profiled element is created independently of operations of building the green tire.

3. The method according to claim 1, wherein the slot at the surface of the profiled element is created during operations of building the green tire.

4. The method according to claim 1, wherein the communication module consists of the radio-frequency transponder.

5. The method according to claim 4, wherein a compound which constitutes the profiled element comprising the slot is electrically insulating.

6. The method according to claim 4, wherein a compound which constitutes the profiled element comprising the slot is not electrically insulating.

7. The method according to claim 1, wherein the communication module consists of the radio-frequency transponder encapsulated in a mass of electrically insulating encapsulating rubber.

8. The method according to claim 7, wherein the radio-frequency transponder is sheathed with electrically insulating encapsulating rubber and the communication module has an axis of rotational symmetry.

9. The method according to claim 1, wherein a fourth layer of rubber compound is laid axially between the turn-up of the at least one carcass reinforcement layer and the second and third layers of rubber compound.

* * * * *